United States Patent [19]

Whalen et al.

[11] Patent Number: 5,047,470
[45] Date of Patent: Sep. 10, 1991

[54] HIGH IMPACT BLENDS OF COPOLYETHER-ESTER ELASTOMERS, RUBBER GRAFT POLYMERS AND STYRENE-ACRYLONITRILE RIGID POLYMERS

[75] Inventors: David Whalen, Washington; Oliver P. Creecy, Elizabeth, both of W. Va.

[73] Assignee: General Electric Company, Parkersburg, W. Va.

[21] Appl. No.: 386,087

[22] Filed: Jul. 28, 1989

[51] Int. Cl.$^5$ ............... C08L 67/02; C08L 35/06; C08L 51/04
[52] U.S. Cl. ............... 525/64; 525/92; 525/166; 525/173; 525/175
[58] Field of Search ............... 525/64, 92, 166, 173, 525/175

[56] References Cited

U.S. PATENT DOCUMENTS

| | | |
|---|---|---|
| 4,280,948 | 7/1981 | Dieck ............... 525/64 |
| 4,346,195 | 8/1982 | Hornbaker et al. ............... 525/64 |
| 4,397,986 | 8/1983 | Hornbaker ............... 525/64 |
| 4,460,741 | 7/1984 | Dufour et al. ............... 525/64 |
| 4,500,679 | 2/1985 | DuFour ............... 525/64 |
| 4,508,870 | 4/1985 | Dufour et al. ............... 525/64 |
| 4,535,124 | 8/1985 | Binsack et al. ............... 525/64 |
| 4,582,876 | 4/1986 | Weemes et al. ............... 525/64 |
| 4,659,765 | 4/1987 | Liu et al. ............... 525/66 |
| 4,666,973 | 5/1987 | Heinz et al. ............... 525/64 |

FOREIGN PATENT DOCUMENTS

| | | |
|---|---|---|
| 135493 | 3/1985 | European Pat. Off. . |
| 202615 | 11/1986 | European Pat. Off. . |
| 3603185 | 8/1986 | Fed. Rep. of Germany . |
| 52-3645 | 1/1977 | Japan . |
| 52-3646 | 1/1977 | Japan . |
| 53-252 | 1/1978 | Japan . |
| 57-205442 | 12/1982 | Japan . |
| 58-25356 | 2/1983 | Japan . |
| 025356 | 2/1983 | Japan ............... 525/64 |
| 59-11353 | 1/1984 | Japan . |
| 59-49255 | 3/1984 | Japan . |
| 61-203157 | 9/1986 | Japan . |
| 205149 | 9/1987 | Japan ............... 525/64 |
| 2171705 | 9/1986 | United Kingdom . |

*Primary Examiner*—John C. Bleutge
*Assistant Examiner*—David Buttner
*Attorney, Agent, or Firm*—Lowe, Price, LeBlanc & Becker

[57] ABSTRACT

Thermoplastic polymer compositions comprise a thermoplastic copolyether-ester elastomer, a rubber graft polymer and a rigid polymer. The rigid polymer is formed from one or more monomers selected from styrene, α-methyl styrene and halogen-substituted styrenes, at least 20 weight percent acrylonitrile, and N-phenyl maleimide, and is included in the compositions to provide improved impact strength and tensile elongation without significantly deteriorating other physical properties of the compositions.

13 Claims, No Drawings

HIGH IMPACT BLENDS OF COPOLYETHER-ESTER ELASTOMERS, RUBBER GRAFT POLYMERS AND STYRENE-ACRYLONITRILE RIGID POLYMERS

FIELD OF THE INVENTION

The present invention relates to thermoplastic polymer compositions comprising a thermoplastic copolyether-ester elastomer, a rubber graft polymer and a styrene-acrylonitrile rigid polymer. More particularly, the present invention relates to such blend compositions which exhibit an advantageous combination of physical properties including good impact strength, tensile elongation and modulus.

BACKGROUND OF THE INVENTION

Blends of thermoplastic polyesters with graft polymers such as ABS and/or rigid polymers are known in the art. For example, the Dieck U.S. Pat. No. 4,280,948, the Hornbaker U.S. Pat. No. 4,397,986, the Binsack et al U.S. Pat. No. 4,535,124, the Heinz et al U.S. Pat. No. 4,666,973, the British Patent Application No. 2,171,705 and West German Reference No. 3,603,185 disclose thermoplastic compositions comprising polyalkylene terephthalate ester polymers and copolymers in combination with graft polymers and/or rigid polymers. The Hornbaker et al U.S. Pat. No. 4,346,195 discloses similar compositions comprising polyethylene terephthalate and a rubber-modified graft copolymer of a vinyl aromatic compound and an $\alpha,\beta$-unsaturated cyclic anhydride, which compositions may further include from about 5 to about 40 percent by weight of one or more impact modifiers. Hornbaker et al further disclose that a preferred impact modifier comprises polyether-ester segmented block copolymers. Japanese References Nos. 57-205442, 58-25356 and 59-11353 disclose additional compositions comprising a polyalkylene terephthalate and a polyether-ester elastomer, and further including a graft copolymer such as ABS and/or a styrene-acrylonitrile copolymer.

The Weemes et al U.S. Pat. No. 4,582,876 discloses blends of copolyether-ester elastomers and rubber-modified styrene-maleic anhydride copolymers having at least two rubbery additives that were present during the polymerization of the copolymers. Japanese Reference No. 59-49255 discloses blends of a maleimide copolymer and a polyether-ester elastomer, a polyether-ester amide and/or polyether amide. The Liu et al U.S. Pat. No. 4,659,765 discloses additional blends of poly(ether ester imide)s, poly(ester imide ethers) and/or poly(ether imide ester)s in combination with a high molecular weight thermoplastic polyester and one or more homopolymers or copolymers derived from vinyl aromatics, esters of acrylic and alkylacrylic acids and/or conjugated dienes. Blends of a copolyether-ester elastomer and a rubber graft polymer such as ABS or MBS are also disclosed in Japanese References Nos. 52-3645, 52-3646, 53-252 and 61-203157.

The Dufour et al U.S. Pat. Nos. 4,460,741 and 4,508,870 and European Patent Applications Nos. 135,493 and 202,615 disclose blend compositions containing a polyether-ester elastomer, a graft polymer such as ABS and a rigid polymer containing styrene and one or more comonomers. These compositions contain relatively low amounts of the polyether-ester elastomer in the range of from about 1 up to 30 weight percent. Finally, the Dufour U.S. Pat. No. 4,500,679 discloses blends of thermoplastic copolyether-ester elastomers, a styrene-maleic anhydride polymer and a rubber graft polymer such as ABS or MBS. The styrene-maleic anhydride polymer may optionally contain from 0 to 20 percent of a termonomer.

These various blends of the prior art exhibit varying combinations of physical properties. Generally, however, one or more good physical properties exhibited by the individual components are deteriorated when the components are blended, whereby the resulting blends exhibit one or more inferior physical properties as compared with the individual components.

SUMMARY OF THE INVENTION

Accordingly, it is an object of the present invention to provide blend compositions which exhibit an advantageous combination of physical properties. It is a further object of the invention to provide blend compositions which comprise a thermoplastic copolyether-ester elastomer, a rubber graft polymer and a rigid polymer. It is a further object of the invention to provide such compositions exhibiting good impact strength, elongation and modulus.

These and additional objects are provided by the thermoplastic polymer compositions according to the present invention. The compositions of the invention comprise from about 40 to about 80 weight percent of a thermoplastic copolyether-ester elastomer, from about 5 to about 50 weight percent of a rubber graft polymer and from about 5 to about 50 weight percent of a rigid polymer comprising styrene and acrylonitrile. More particularly, the rigid polymer included in the polymer blend compositions of the invention is formed from at least about 50 weight percent of one or more monomers selected from the group consisting of styrene, alpha-methylstyrene and halogen-substituted styrene, and at least 20 weight percent acrylonitrile. It has been discovered that the addition of this specifically defined rigid polymer to blend compositions comprising a thermoplastic copolyether-ester elastomer and a rubber graft polymer exhibit improved impact properties and tensile elongation, particularly as compared with blends comprising the copolyether-ester elastomer and the rubber graft polymer, without exhibiting a significant loss of either modulus or strength properties. Thus, the thermoplastic polymer compositions of the invention exhibit an advantageous combination of properties which promote their use in various applications.

These and additional objects and advantages provided by the polymer compositions of the invention will be more fully understood in view of the following detailed description.

DETAILED DESCRIPTION

The thermoplastic polymer compositions according to the present invention comprise three main components, namely a thermoplastic copolyether-ester elastomer, a rubber graft polymer and a rigid polymer formed from styrene and acrylonitrile. In order to provide a good combination of physical properties, the polymer compositions comprise from about 40 to about 80 weight percent of the thermoplastic copolyether-ester elastomer, from about 5 to about 50 weight percent of the rubber graft polymer and from about 5 to about 50 weight percent of the rigid polymer. In a more preferred embodiment, the thermoplastic polymer compositions of the invention comprise from about 50 to about 70 weight percent of the thermoplastic copolyether-ester elastomer, from about 15 to about 40 weight percent of the rubber graft polymer, and from about 10 to about 30 weight percent of the rigid polymer.

The thermoplastic copolyether-ester elastomer component of the present polymer compositions may be any of those known in the art and containing long chain ester units derived from a difunctional polyether glycol and a dicarboxylic acid and short chain ester units derived from one or more organic diols and a dicarboxylic acid. The long chain ester units are generally of the formula —O—G—O—CO—R—CO— wherein G is a divalent radical remaining after removal of the terminal hydroxyl groups from a polyether glycol and R is one or more divalent radicals remaining after removal of carboxyl groups from a dicarboxylic acid. The short chain ester units are of the general formula 'O—D—O—CO—R—CO— wherein D is one or more divalent radicals remaining after the removal of the terminal hydroxyl groups from one or more organic diols, preferably low molecular weight diols, and R is one or more divalent radicals remaining after removal of carboxyl groups from a dicarboxylic acid. Generally, the thermoplastic copolyether-ester elastomer is a segmented polymer comprising from about 30 percent to about 80 percent by weight of segments of such long chain units and from about 70 percent to about 20 percent by weight of segments of such short chain units. Polyether glycols having a number average molecular weight of from about 350 to about 6,000 are suitable for use in preparing the copolyether-ester elastomer, with polyether glycols having a molecular weight between about 800 and 4,000 being preferred. In particular, poly-(alkylene oxide) glycols are preferred. Further details on the preparation, composition and properties of such segmented thermoplastic copolyether-ester elastomers are set forth in U.S. Pat. Nos. 3,023,192, 3,651,014, 3,766,146, 3,775,373, 3,784,520 and 3,891,604, all of which are assigned to DuPont and Company, and the disclosures of which are incorporated herein by reference. Particularly suitable thermoplastic copolyether-ester elastomers for use in the present invention are derived from terephthalic acid, polytetramethylene ether glycol and 1,4-butanediol, from terephthalic acid, polytetramethylene ether glycol, 1,4-butanediol and 1,6-hexanediol, and from isophthalic acid, polypropylene ether glycol and 1,4-butanediol.

The rubber graft polymer which is included in the thermoplastic polymer compositions of the invention comprises from about 10 to about 90 weight percent of a rubbery polymer substrate and from about 10 to about 90 weight percent of a grafting copolymer grafted to the rubbery polymer substrate. Preferably, the rubber graft is a high rubber graft polymer and comprises from about 50 to about 85 weight percent of the rubbery polymer substrate and from about 50 to about 15 weight percent of the grafting copolymer. In addition to exhibiting good physical properties, polymer compositions containing a high content of rubber substrate in the graft polymer exhibit improved paintability. That is, when objects manufactured from these compositions are provided with a paint coating, the paint coating adheres to the surface with sufficient force that it is not easily removed during subsequent masking and painting operations, as well as during final assembly and in the end use of the finished product. Suitable rubbery substrate polymers include polymers and copolymers of conjugated dienes, alkylacrylate polymers, and copolymers of ethylenically unsaturated olefins and non-conjugated diene rubbers (EPDM). Preferably, the rubbery polymer substrate comprises polybutadiene, a polybutadiene-styrene copolymer, a polybutylacrylate or an ethylene-propylene-norborene polymer.

The grafting copolymer which is grafted to the rubbery polymer substrate is formed from two or more monomers from the following groups: vinyl aromatic monomers, halogen-substituted vinyl aromatic monomers, alkyl-substituted vinyl aromatic monomers, acrylonitrile, substituted acrylonitriles, ethylenically unsaturated carboxylic acids, diacids, dianhydrides, acid esters, diacid esters, amides, imides and N-substituted imides, acrylates and alkylacrylates. It is preferred that the grafting copolymer is formed from about 60 to about 95 weight percent of at least one monomer selected from the group consisting of styrene, α-methylstyrene, halogen-substituted styrene, and methyl methacrylate, and from about 5 to about 40 weight percent of at least one different monomer selected from the group consisting of acrylonitrile, methyl methacrylate, maleic anhydride, maleimide, N-phenyl maleimide and acrylamide. In a more preferred embodiment, the grafting copolymer is formed from about 60 to about 80 weight percent of at least one monomer selected from the former group and from about 20 to about 40 weight percent of at least one different monomer selected from the latter group.

Additionally, it is preferred that the grafting copolymer is formed from at least one monomer selected from the group consisting of styrene, α-methylstyrene and dibromostyrene, and from acrylonitrile. Preferred grafting copolymers include, but are not limited to, the following: styrene-acrylonitrile; styrene-acrylonitrile-maleic anhydride; styrene-α-methylstyrene-acrylonitrile; styrene-α-methylstyrene-acrylonitrile-N-phenyl maleimide; styrene-acrylonitrile-N-phenyl maleimide; styrene-acrylonitrile-N-phenyl maleimide-maleic anhydride; styrene-methyl methacrylate-acrylonitrile; styrene-methyl methacrylate-acrylonitrile-maleic anhydride; styrene-methyl methacrylate-α-methylstyrene-acrylonitrile; styrene-methyl methacrylate-α-methylstyrene-acrylonitrile-N-phenyl maleimide; styrene-methyl methacrylate-acrylonitrile-N-phenyl maleimide; styrene-methyl methacrylate-acrylonitrile-N-phenyl maleimide-maleic anhydride; styrene-dibromostyrene-acrylonitrile; styrene-dibromostyrene-acrylonitrile; styrene-dibromostyrene-acrylonitrile-maleic anhydride; styrene-dibromostyrene-α-methylstyrene-acrylonitrile; and styrene-dibromostyrene-acrylonitrile-N-phenyl maleimide.

The rubber graft polymer component may be prepared according to any of the methods well known in the art including emulsion, bulk, mass or suspension processes.

In accordance with an important feature of the invention, the polymer compositions further contain a rigid polymer formed from styrene and acrylonitrile. More particularly, the rigid copolymer is formed from at least about 50 weight percent of one or more monomers selected from the group consisting of styrene, α-methylstyrene and halogen-substituted styrene, and at least 20 weight percent acrylonitrile. It has been discovered that such a rigid copolymer improves the impact properties and/or tensile elongation without causing a significant loss of either modulus or strength properties. Preferably, the rigid copolymer is formed from 20 to about 40 weight percent acrylonitrile. The rigid copolymer may further include at least one additional monomer, for example maleic anhydride, methyl methacrylate and/or a maleimide, for example N-phenyl maleimide, as long as the rigid copolymer includes at least 20 weight percent acrylonitrile based on the total weight of the rigid copolymer. In a further preferred embodiment, the rigid copolymer is formed from styrene monomer and at least one monomer selected from α-methylstyrene and halogen-substituted styrene, in addition to the acrylonitrile.

In an additional embodiment of the thermoplastic polymer compositions of the invention, the compositions comprise a thermoplastic copolyether-ester elastomer, a rubber graft polymer and a rigid component consisting essentially of a copolymer formed from at least about 50 weight percent of one or more monomers selected from the group consisting of styrene, α-methylstyrene and halogen-substituted styrene, and at least 20 weight percent acrylonitrile. That is, the rigid copolymer is the essential rigid component included in the polymer compositions. Other rigid components, for example polycarbonates, polyalkylene terephthalates, and the like are excluded since such additional rigid components can detrimentally affect one or more physical properties of the blend compositions. For example, the addition of only a small amount of polycarbonate to the polymer compositions of the invention resulted in a significant loss of heat resistant properties.

The compositions of the present invention are more fully demonstrated by way of the following examples. Throughout the examples, parts refers to parts by weight unless otherwise specified. Additionally, the following abbreviations are used throughout the examples:

CPEE-1: Copolyether-ester elastomer having a nominal modulus of 10,000 supplied by General Electric as LOMOD BOO1OO.
CPEE-2: Copolyether-ester elastomer having a nominal modulus of 20,000 supplied by General Electric as LOMOD BO2OO.
CPEE-3: Copolyether-ester elastomer supplied by DuPont as Hytrel 4059FG.
CPEE-4: Copolyether-ester elastomer supplied by DuPont as Hytrel 5526.
ABS-1: Graft copolymer containing 23 parts acrylonitrile, 35 parts butadiene, 42 parts styrene.
ABS-2: Graft copolymer containing 15 parts acrylonitrile, 50 parts butadiene, 35 parts styrene.
ABS-3: Graft copolymer containing 12.5 parts acrylonitrile, 50 parts butadiene, 37.5 parts styrene.
ABS-4: Graft copolymer containing 12.5 parts acrylonitrile, 50 parts butadiene, 37.5 parts styrene.
ABS-5: Graft copolymer containing 7.5 parts acrylonitrile, 70 parts butadiene, 22.5 parts styrene.
ABS-6: Graft copolymer containing 17 parts acrylonitrile, 31 parts butadiene, 52 parts styrene.
SAN-1: Rigid copolymer containing 72 parts styrene, 28 parts acrylonitrile.
SAN-2: Rigid copolymer containing 72 parts styrene, 28 parts acrylonitrile.
SAN-3: Rigid copolymer containing 75 parts styrene, 25 parts acrylonitrile.
SAN-4: Rigid copolymer containing 3 parts styrene, 31 parts acrylonitrile, 66 parts α-methylstyrene.
SAN-5 Rigid copolymer containing 19 parts styrene, 28 parts acrylonitrile, 7 parts N-phenyl maleimide, 46 parts α-methylstyrene.
SAN-6: Rigid copolymer containing 23 parts styrene, 29 parts acrylonitrile, 11 parts N-phenyl maleimide, 37 parts α-methylstyrene.
CE SAN-1: Rigid copolymer containing 72 parts styrene, 17 parts acrylonitrile, 11 parts maleic anhydride.
CE SAN-2: Rigid copolymer containing 72 parts styrene, 6 parts acrylonitrile, 22 parts maleic anhydride.
CE SAN-3: Rigid copolymer containing 39.5 parts styrene, 15 parts acrylonitrile, 45.5 parts methyl methacrylate.

EXAMPLE 1

In this example, thermoplastic polymer compositions were prepared according to the present invention comprising a copolyether-ester elastomer, a rubber graft polymer and a rigid copolymer containing styrene and acrylonitrile. The specific components and the parts by weight in which they were employed are set forth in Table I. The resulting compositions were subjected to measurement of Izod Impact according to ASTM D-256 at the indicated temperatures using a sample size of ⅛-inch by ½-inch and to measurement of Inst. Dart (Dynatup) Impact according to ASTM D-3763 at the indicated temperatures using a sample thickness of ⅛-inch, a ½-inch tup, a 1½-inch test area and an 8.75 ft/s impact speed. The total energy value represents the total energy absorbed by the impact. Tensile properties of the compositions were also measured according to ASTM D638. The results of these measurements are also set forth in Table I.

TABLE I

|  | 1A | 1B | 1C | 1D | 1E | 1F | 1G |
|---|---|---|---|---|---|---|---|
| CPEE-1 | — | — | — | — | — | — | 55 |
| CPEE-2 | — | — | — | — | 55 | 55 | — |
| CPEE-3 | — | 55 | — | 55 | — | — | — |
| CPEE-4 | 55 | — | 55 | — | — | — | — |
| ABS-1 | 45 | 45 | — | — | 45 | — | 45 |
| ABS-2 | — | — | 31.5 | 31.5 | — | 31.5 | — |
| SAN-1 | — | — | 13.5 | 13.5 | — | 13.5 | — |
| Izod Impact (⅛", ft-lb/in) | | | | | | | |
| −20° F. | 1.1 | 5.5 | 11.1 | 12.5 | 0.8 | 1.7 | 1.4 |
| −40° F. | 0.6 | 3.6 | 2.8 | 14.5 | 0.6 | 1.4 | 1.1 |
| Inst. Dart Impact | | | | | | | |
| −20° F. Energy at Peak (ft-lb) | 13.2 | 20.0 | 17.8 | 18.9 | 5.4 | 18.3 | 16.1 |
| Fail Point (ft-lb) | 16.8 | 27.6 | 29.7 | 23.8 | 5.6 | 27.1 | 23.7 |
| % Ductile | 0 | 100 | 100 | 100 | 0 | 80 | 0 |
| Tensile Properties | | | | | | | |
| Yield Strength (psi) | 2820 | 1725 | 2575 | 1630 | 2390 | 2225 | 1857 |
| % Elongation | 204 | 358 | 431 | 724 | 102 | 374 | 69 |

TABLE I-continued

|  | 1A | 1B | 1C | 1D | 1E | 1F | 1G |
|---|---|---|---|---|---|---|---|
| Modulus (psi) | 74700 | 31400 | 72500 | 33100 | 69800 | 65300 | 48700 |

As set forth in Table I, Compositions 1A, 1B, 1E and 1G are comparative compositions containing only the copolyether-ester elastomer and a rubber graft polymer. On the other hand, Compositions 1C, 1D and 1F are according to the present invention and contain a copolyether-ester elastomer, a rubber graft polymer and a rigid copolymer containing at least 20 weight percent acrylonitrile. All of Compositions 1A-1G contain an approximately equivalent amount of rubbery polymer substrate in the overall polymer compositions. Compositions 1C, 1D and 1F exhibited significantly improved Izod Impact and tensile elongation properties as compared with Compositions 1A, 1B and 1E, respectively. Moreover, Compositions 1C, 1D and 1F according to the present invention did not exhibit a significant loss of either modulus or strength properties. Thus, the compositions according to the present invention exhibited an advantageous combination of physical properties.

EXAMPLE 2

This example demonstrates the preparation of polymer compositions according to the present invention using a variety of rubber graft polymers. The specific components and the parts by weight in which they were used are set forth in Table II. The resulting polymer compositions were subjected to measurement of Izod Impact, Inst. Dart Impact and tensile properties using the procedures described in Example 1. The results of these measurements are also set forth in Table II.

TABLE II

|  | 2A | 2B | 2C | 2D | 2E |
|---|---|---|---|---|---|
| CPEE-2 | 55 | 55 | 55 | 55 | 55 |
| ABS-1 | 45 | — | — | — | — |
| ABS-2 | — | 31.5 | — | — | — |
| ABS-3 | — | — | 31.5 | — | — |
| ABS-4 | — | — | — | 31.5 | — |
| ABS-5 | — | — | — | — | 22.5 |
| SAN-1 | — | 13.5 | 13.5 | 13.5 | 22.5 |
| Izod Impact (⅛", ft-lb/in) | | | | | |
| −20° F. | 0.6 | 1.5 | 1.3 | 1.2 | 1.5 |
| −40° F. | 0.6 | 1.3 | 1.1 | 1.0 | 1.2 |
| Inst. Dart Impact | | | | | |
| −20° F. Energy at Peak (ft-lb) | 14.2 | 9.0 | 17.7 | 17.9 | 17.8 |
| Energy at Failure (ft-lb) | 18.9 | 14.6 | 29.9 | 30.6 | 29.9 |
| Ductile/Brittle | 0/5 | 1/4 | 5/0 | 5/0 | 5/0 |
| −40° F. Energy at Peak (ft-lb) | 7.0 | 6.2 | 13.2 | 18.9 | 13.6 |
| Energy at Failure (ft-lb) | 7.2 | 8.5 | 19.3 | 32.5 | 21.8 |
| Ductile/Brittle | 0/5 | 1/4 | 2/3 | 5/0 | 3/1 |
| Tensile Properties | | | | | |
| Yield Strength (psi) | 2495 | 2287 | 2460 | 2400 | 2433 |
| % Elongation | 110 | 366 | 321 | 365 | 263 |
| Modulus (psi) | 75600 | 69300 | 79700 | 73100 | 75600 |
| Flexural Strength (psi) | 2623 | 2365 | 2620 | 2550 | 2620 |
| Modulus (psi) | — | 65000 | 68600 | 67800 | 70700 |

As is evident from Table II, Composition 2A is a comparative composition and contains only a copolyether-ester elastomer and a rubber graft polymer. On the other hand, Compositions 2B-2E are according to the present invention and contain a copolyether-ester elastomer, a rubber graft and a rigid copolymer containing styrene and at least 20 weight percent acrylonitrile. All of Compositions 2A-2E contain approximately the same weight percent of the rubbery polymer substrate in the overall compositions. As set forth in Table II, Compositions 2B-2E according to the present invention exhibited improved Izod Impact and tensile elongation as compared with Composition 2A. Moreover, the compositions according to the present invention also exhibited good modulus and strength properties.

EXAMPLE 3

This example demonstrates the preparation of polymer compositions according to the present invention using various rigid copolymers of styrene and acrylonitrile. The individual components and the parts by weight in which they were used are set forth in Table III. The resulting compositions were subjected to measurement of Izod Impact, Inst. Dart Impact and tensile properties according to the procedures described in Example 1. The results of these measurements are also set forth in Table III.

TABLE III

|  | 3A | 3B | 3C | 3D | 3E | 3F |
|---|---|---|---|---|---|---|
| CPEE-1 | 55.0 | 55.0 | 55.0 | 55.0 | 55.0 | 55.0 |
| ABS-4 | — | 27.0 | 27.0 | 27.0 | 27.0 | 27.0 |
| ABS-6 | 45.0 | — | — | — | — | — |
| SAN-1 | — | 18.0 | — | — | — | — |
| SAN-4 | — | — | — | 18.0 | — | — |
| SAN-5 | — | — | — | — | — | 18.0 |
| CE SAN-1 | — | — | 18.0 | — | — | — |
| CE SAN-5 | — | — | — | — | 18.0 | — |
| Izod Impact (⅛", ft-lb/in) | | | | | | |
| −20° F. | 1.6 | 1.7 | 1.0 | 1.9 | 1.4 | 2.1 |
| −40° F. | 0.9 | 1.2 | 1.3 | 1.4 | 1.2 | 1.6 |
| Inst. Dart Impact | | | | | | |
| −20° F. Energy at Peak (ft-lb) | 16.8 | 17.1 | 16.5 | 16.3 | 17.6 | 17.2 |
| Energy at 50% Failure (ft-lb) | 26.0 | 26.3 | 25.8 | 25.8 | 26.4 | 25.1 |
| Ductile/Brittle | 5/0 | 5/0 | 5/0 | 5/0 | 4/1 | 5/0 |
| −40° F. Energy at Peak (ft-lb) | 17.5 | 17.8 | 18.2 | 17.8 | 14.8 | 17.6 |
| Energy at Failure (ft-lb) | 28.7 | 29.4 | 29.7 | 28.4 | 24.7 | 29.9 |
| Ductile/Brittle | 5/0 | 5/0 | 5/0 | 5/0 | 0/5 | 5/0 |
| Tensile Properties | | | | | | |
| Yield Strength (psi) | 1930 | 1930 | 1885 | 1887 | 1830 | 1870 |
| % Elongation | 159 | 161 | 127 | 122 | 157 | 176 |
| Modulus (psi × 10,000) | 5.6 | 6.0 | 5.1 | 5.2 | 5.1 | 4.9 |
| Flexural Modulus (psi × 10,000) | 5.5 | 5.8 | 4.8 | 4.9 | 4.8 | 5.0 |

As is evident from Table III, Composition 3A is a comparative composition containing only polyether-ester elastomer and a rubber graft polymer. Compositions 3B, 3D and 3F are according to the present invention and contain a copolyether-ester elastomer, a rubber graft and a rigid copolymer containing styrene and at least 20 weight percent acrylonitrile. Compositions 3C and 3E are also comparative in that the rigid copolymer included therein contains less than 20 weight percent acrylonitrile. As indicated in Table III, Compositions 3B, 3D and 3F according to the present invention exhibited improved Izod Impact at −20° F. as compared with both Comparative Composition 3A and Comparative Compositions 3C and 3E. All of Compositions 3B-3F exhibited improved Izod Impact as compared with Comparative Composition 3A when measured at −40° F. The compositions according to the present invention also exhibited an advantageous combination of Inst. Dart Impact and tensile properties while Comparative Compositions 3C and 3E exhibited various inferior properties.

EXAMPLE 4

In this example, additional compositions were prepared according to the present invention using various rigid copolymers. The individual components and parts by weight in which they were used in these compositions are set forth in Table IV. Also set forth in Table IV are results of Izod Impact, Inst. Dart Impact and tensile properties performed as described in Example 1.

TABLE IV

|  | 4A | 4B | 4C | 4D | 4E | 4F | 4G | 4H | 4I | 4J |
|---|---|---|---|---|---|---|---|---|---|---|
| CPEE-2 | 55 | 55 | 55 | 55 | 55 | 55 | 55 | 55 | 55 | 55 |
| ABS-4 | — | 27 | 27 | 27 | 27 | 27 | 27 | 27 | 27 | 27 |
| ABS-6 | 45 | — | — | — | — | — | — | — | — | — |
| SAN-1 | — | — | 18 | — | — | — | — | — | — | — |
| SAN-2 | — | 18 | — | — | — | — | — | — | — | — |
| SAN-3 | — | — | — | 18 | — | — | — | — | — | — |
| SAN-4 | — | — | — | — | — | — | 18 | — | — | — |
| SAN-5 | — | — | — | — | — | — | — | — | 18 | — |
| SAN-6 | — | — | — | — | — | — | — | — | — | 18 |
| CE SAN-1 | — | — | — | — | 18 | — | — | — | — | — |
| CE SAN-2 | — | — | — | — | — | 18 | — | — | — | — |
| CE SAN-3 | — | — | — | — | — | — | — | 18 | — | — |
| Izod Impact ($\frac{1}{4}$", ft-lb/in) | | | | | | | | | | |
| −20° F. | 1.0 | 1.1 | 1.2 | 1.3 | 1.2 | 1.4 | 1.5 | 1.2 | 1.3 | 1.2 |
| −40° F. | 0.8 | 1.0 | 1.1 | 1.1 | 1.1 | 1.2 | 1.0 | 1.3 | 1.0 | 1.2 |
| Inst. Dart Impact | | | | | | | | | | |
| −20° F. Energy at Peak (ft-lb) | 13.6 | 14.3 | 18.7 | 18.2 | 18.9 | 18.8 | 18.6 | 18.9 | 19.7 | 17.2 |
| Energy at Failure (ft-lb) | 18.5 | 21.0 | 30.2 | 29.8 | 30.0 | 29.5 | 30.3 | 30.2 | 30.4 | 25.8 |
| Ducticle/Brittle | 2/2 | 3/2 | 5/0 | 5/0 | 5/0 | 5/0 | 5/0 | 1/4 | 5/0 | 4/1 |
| −40° F. Energy at Peak (ft-lb) | 11.0 | 14.3 | 17.3 | 19.4 | 17.6 | 19.0 | 19.5 | 16.8 | 20.3 | 16.9 |
| Energy at Failure (ft-lb) | 16.8 | 4.2 | 24.7 | 33.3 | 28.8 | 29.4 | 32.8 | 27.4 | 32.8 | 22.3 |
| Ductile/Brittle | 1/3 | 0/5 | 2/3 | 5/0 | 4/1 | 4/1 | 5/0 | 0/5 | 3/2 | 1/4 |
| Strength Properties | | | | | | | | | | |
| Tensile Strength (psi) | 2540 | 2555 | 2620 | 2560 | 2535 | 2525 | 2515 | 2425 | 2510 | 2523 |
| % Elongation | 208 | 254 | 193 | 248 | 245 | 285 | 252 | 260 | 208 | 220 |
| Tensile Mod. (psi × 10,000) | 8.3 | 8.3 | 3.4 | 8.2 | 8.0 | 7.7 | 8.2 | 7.7 | 8.0 | 7.6 |
| Flexural Mod. (psi × 10,000) | 7.5 | 7.7 | 8.4 | 8.3 | 7.4 | 7.2 | 7.9 | 7.6 | 7.6 | 7.4 |

As set forth in Table IV, Composition 4A is a comparative composition containing only a copolyether-ester elastomer and a rubber graft polymer. Compositions 4B-4D, 4G, 4I and 4J are according to the present invention and contain a copolyether-ester elastomer, a rubber graft polymer and a rigid copolymer containing styrene and at least 20 weight percent acrylonitrile. Compositions 4E, 4F and 4H are comparative compositions in which the rigid copolymer contains less than 20 weight percent acrylonitrile. While all of Compositions 4B-4J exhibited improved Izod Impacts as compared with Comparative Composition 4A, the compositions according to the present invention, namely 4B-4D, 4-G, 4I and 4J also exhibited an advantageous combination of other physical properties. On the other hand, Comparative Compositions 4E, 4F and 4H exhibited various insignificant physical properties, particularly tensile properties, as compared with the compositions according to the present invention.

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A thermoplastic polymer composition, comprising
   (a) from about 40 to about 80 weight percent of a thermoplastic copolyether-ester elastomer;
   (b) from about 5 to about 50 weight percent of a rubber graft polymer comprising from about 50 to about 85 weight percent of a rubbery polymer substrate and from about 15 to about 50 weight percent of a grafting copolymer grafted to the rubbery polymer substrate, said grafting copolymer being formed from about 60 to about 95 weight percent of at least one monomer selected from the group consisting of styrene, α-methyl styrene, halogen-substituted styrene and methyl methacrylate and from about 5 to about 40 weight percent of at least one different monomer selected from the group consisting of acrylonitrile, methyl methacrylate, maleic anhydride, maleimide, N-phenyl maleimide and acrylamide; and
   (c) from about 5 to about 50 weight percent of a rigid polymer formed from (i) at least about 50 weight percent of one or more monomers selected from the group consisting of styrene, α-methyl styrene and halogen-substituted styrene, (ii) at least 20 percent acrylonitrile, and (iii) N-phenyl maleimide.

2. A thermoplastic polymer composition as defined by claim 1, comprising from about 50 to about 70 weight percent of the thermoplastic copolyether-ester elastomer, from about 15 to about 40 weight percent of the rubber graft polymer, and from about 10 to about 30 weight percent of the rigid polymer.

3. A thermoplastic polymer composition as defined by claim 1, wherein the thermoplastic copolyether-ester elastomer contains long chain ester units derived from a difunctional polyether glycol and a dicarboxylic acid and short chain ester units derived from one or more organic diols and a dicarboxylic acid.

4. A thermoplastic polymer composition as defined by claim 3, wherein the long chain ester units are derived from poly(alkylene oxide) glycol and dicarboxylic acid.

5. A thermoplastic polymer composition as defined by claim 3, wherein the thermoplastic copolyether-ester elastomer is derived from terephthalic acid, polytetramethylene ether glycol and 1,4-butanediol, from terephthalic acid, polytetramethylene ether glycol, 1,4-butanediol and 1,6-hexanediol, or from isophthalic acid, polypropylene ether glycol and 1,4-butanediol.

6. A thermoplastic polymer composition as defined by claim 1, wherein the rubber graft polymer comprises a rubbery polymer substrate selected from the group consisting of polymers and copolymers of conjugated dienes, alkyl acrylate polymers, and copolymers of ethylenically unsaturated olefins and non-conjugated diene rubbers.

7. A thermoplastic polymer composition as defined by claim 6, wherein the rubbery polymer substrate is selected from the group consisting of polybutadiene, polybutadiene-styrene copolymers, polybutylacrylates and ethylene-propylene-norborene polymers.

8. A thermoplastic polymer composition as defined by claim 1, wherein the grafting copolymer is formed from at least one monomer selected from the group consisting of styrene, α-methyl styrene and dibromostyrene, and from acrylonitrile.

9. A thermoplastic polymer composition as defined by claim 1, wherein the grafting coplymer is formed from styrene and acrylonitrile.

10. A thermoplastic polymer composition as defined by claim 1, wherein the rigid polymer is formed from 20 to about 40 weight percent acrylonitrile.

11. A thermoplastic polymer composition as defined by claim 10, wherein the rigid polymer is formed from at least one additional monomer selected from the group consisting of maleic anhydride and methyl methacrylate.

12. A thermoplastic polymer composition as defined by claim 10, wherein the rigid polymer is formed from (i) styrene, (ii) at least one monomer selected from the group consisting of α-methyl styrene and halogen-substituted styrenes, (iii) acrylonitrile and (iv) N-phenyl maleimide.

13. A thermoplastic polymer composition, comprising
(a) from about 40 to about 80 weight percent of a thermoplastic copolyether-ester elastomer;
(b) from about 5 to about 50 weight percent of a rubber graft polymer comprising from about 50 to about 85 weight percent of a rubbery polymer substrate and from about 15 to about 50 weight percent of a grafting copolymer grafted to the rubbery polymer substrate, said grafting copolymer being formed from about 60 to about 95 weight percent of at least one monomer selected from the group consisting of styrene, α-methyl styrene, halogen-substituted styrene and methyl methacrylate and from about 5 to about 40 weight percent of at least one different monomer selected from the group consisting of acrylonitrile, methyl methacrylate, maleic anhydride, maleimide, N-phenyl maleimide and acrylamide; and
(c) from about 5 to about 50 weight percent of a rigid component consisting essentially of a polymer formed from (i) at least about 50 weight percent of one or more monomers selected from the group consisting of styrene, α-methyl styrene and halogen-substituted styrene, (ii) at least 20 weight percent acrylonitrile, and (iii) N-phenyl maleimide.

* * * * *